Dec. 28, 1937.  R. J. GUBA  2,103,920
CONVEYER BELT
Filed Dec. 8, 1936  3 Sheets-Sheet 1

INVENTOR:
R. J. Guba,
by Murray G. Boyer
Atty.

Dec. 28, 1937.　　　　R. J. GUBA　　　　2,103,920
CONVEYER BELT
Filed Dec. 8, 1936　　　3 Sheets-Sheet 2
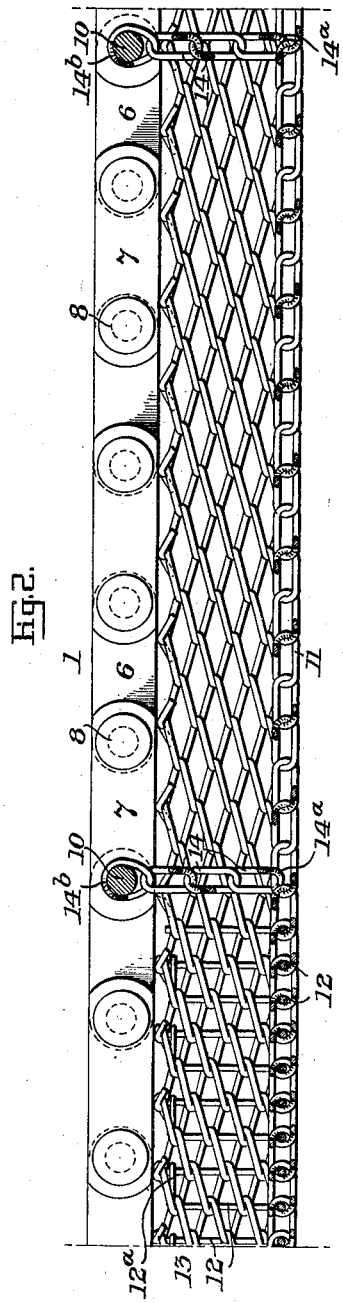
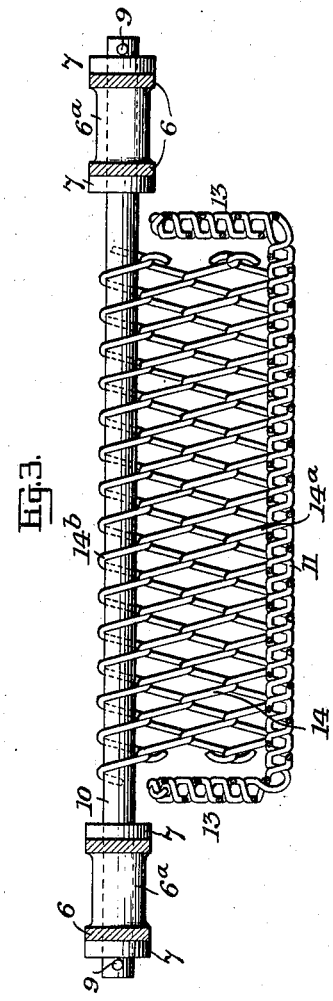
INVENTOR:
R. J. Guba,
by Murray C. Boyle
Atty.

Dec. 28, 1937.  R. J. GUBA  2,103,920
CONVEYER BELT
Filed Dec. 8, 1936  3 Sheets-Sheet 3
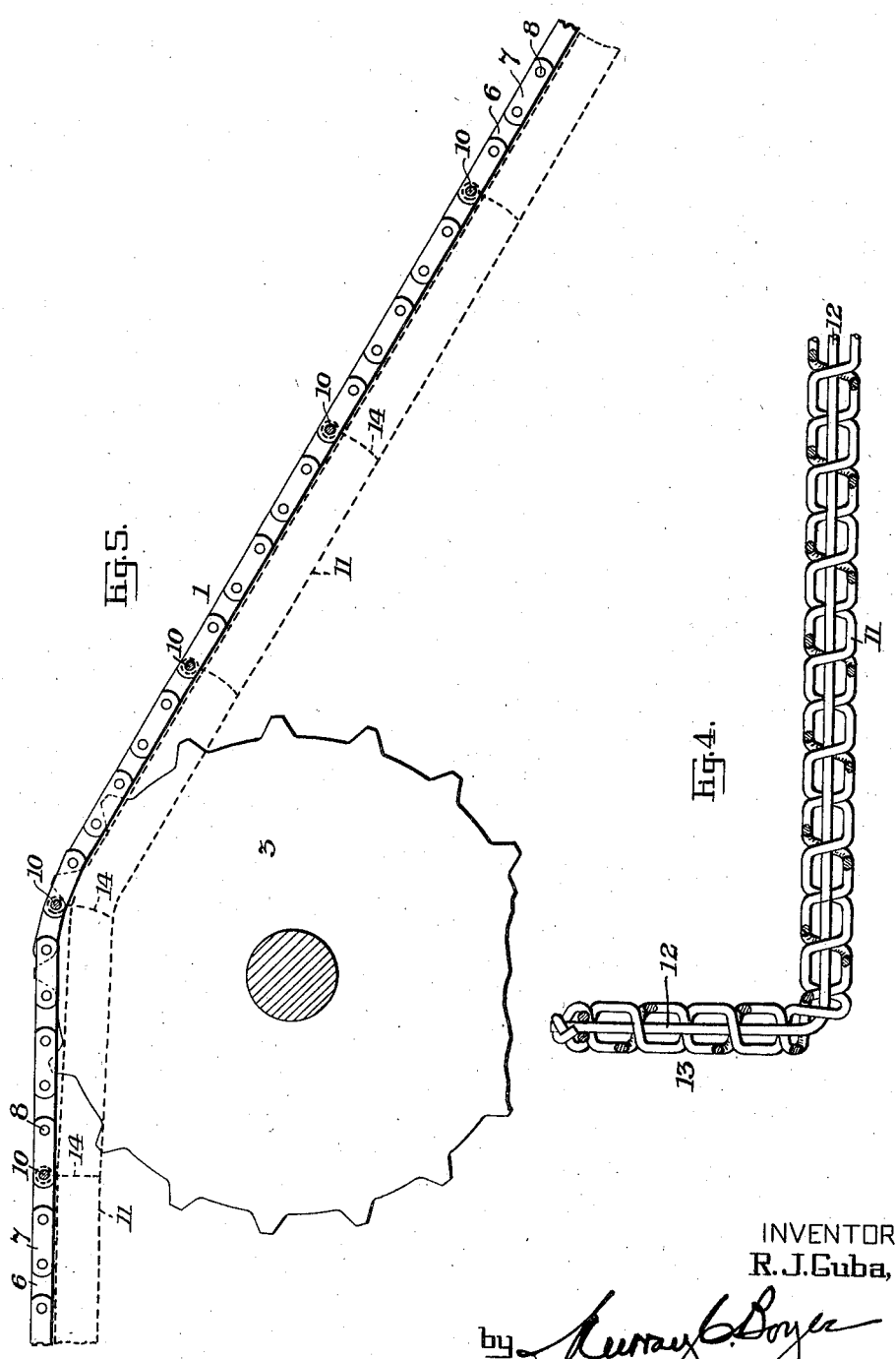
INVENTOR:
R. J. Guba,
by Murray C. Boyer
Atty.

Patented Dec. 28, 1937

2,103,920

UNITED STATES PATENT OFFICE 2,103,920

CONVEYER BELT

Raymond J. Guba, Philadelphia, Pa., assignor to Audubon Wire Cloth Corporation, Philadelphia, Pa., a corporation of New Jersey Application December 8, 1936, Serial No. 114,734

14 Claims. (Cl. 198—194)

My invention relates to conveyer belts and comprises a belt structure made up of a plurality of drive chains in parallel relation; cross-bars spacing and connecting said chains and providing pivotal connections for certain of their links; a continuous fabric with flanged marginal edges made up of helically coiled wires transversely arranged and interconnected together, and means for supporting such fabric from said cross-bars. The supporting means for the continuous fabric may be in the form of sections of fabric made of helically coiled wires which, in addition to supporting the continuous fabric, will serve as division walls to provide a supporting carrier or conveyer belt having a succession or series of pockets.

The continuous wire fabric made up of interconnected transversely arranged helically coiled wires may include straight cross wires disposed within the bights of adjacent helically coiled wires; one end of each of said straight wires being coiled around the end of an adjacent straight wire within the margin of the fabric and such connected ends alternating at opposite edges of the fabric. Fabric of such type is illustrated in the application of Otto C. Scherfel, filed April 29, 1936, under Serial No. 76,922.

These and other features of my invention are more fully described hereinafter; reference being had to the accompanying drawings, in which:

Fig. 2 is a longitudinal sectional view on the line II—II, Fig. 1.

Figs. 3 and 4 are cross sectional views on the lines III—III and IV—IV, Fig. 1, and Fig. 5 is a diagrammatic view illustrating a portion of an inclined run of my improved conveyer belt.

Figure 1:
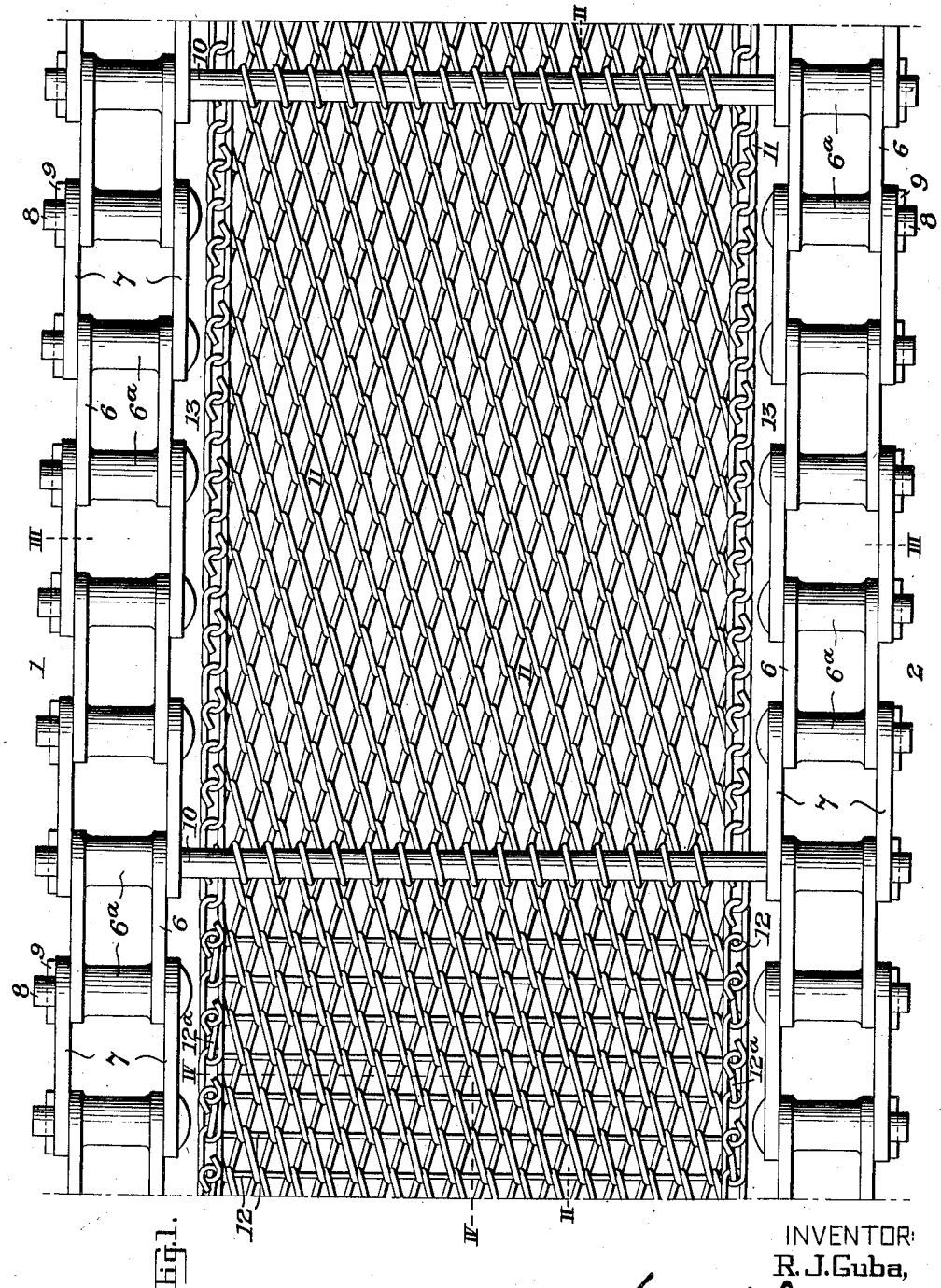
Figure 1 is a plan view of a section of conveyer belt within the scope of my invention.

My improved conveyer belt comprises chains 1 and 2 adapted to toothed driving and idler wheels, one of which is indicated at 3, in Fig. 5, and a continuous fabric made up of interconnected transversely arranged helically coiled wires disposed between the chains and hung from the latter. These drive chains are of a more or less usual construction and may comprise links 6, having integral cross-bars 6ª; the links 6 being connected together in properly spaced relation by other links 7, with headed pivot pins 8 passing through registering apertures of the same and held in any suitable manner, as by cotter pins 9. These drive chains are spaced at regular intervals by cross-bars 10, which also function as pivot pins for certain of the links 6 and 7.

Between the drive chains and disposed in a plane below their pitch line, I provide a continuous wire fabric made up of transversely arranged helically coiled wires 11, in interconnected relation, and this fabric may be plain as illustrated by the portion to the right of Figs. 1 and 2, or it may include cross connecting wires 12 disposed between the bights of each adjacent pair of interconnecting helically coiled wires, as illustrated at the left of Figs. 1 and 2. The straight cross wires will preferably have one end 12ª, in alternate relation, bent over and connected to an adjacent cross wire in the manner illustrated in the Scherfel application before referred to.

The continuous wire fabric made up of the transversely arranged helically coiled wires, as well as the cross connecting wires when used, is bent at the sides substantially at right angles to the transverse runs of the wires making up the same to provide marginal retaining flanges 13, and such continuous fabric is spaced a suitable distance away from the pitch line of the chains so that in practice such fabric may be said to lie below the chains when in the carrying position. The bent up side portions including the ends of the helically coiled wires, and the cross connector wires when used, provide upstanding marginal walls or flanges to retain material transported by the conveyer.

The continuous fabric is supported from the cross-bars 10 connecting and spacing the chains by suitable means that will maintain the spaced relation, and such supports may be sections of fabric made up of interconnected helically coiled wires 14; the lowermost wire 14ª of each of such sections being twisted through a helically coiled wire of the continuous fabric, while the uppermost wires 14ᵇ of each of such supports is coiled over the cross-bars 10. By such arrangement division walls are provided, preferably at regular intervals throughout the conveyer, and these division walls serve to provide the conveyer belt with a succession of pockets to receive articles to be conveyed, small castings, and the like.

The continuous fabric may be formed of helically coiled wires extending to the right or left as may be desired, since the fabric itself does not pass in contact with a driving or idler pulley element but is wholly supported by the drive chains, and the sections of wire fabric which function as supports may be made of right or left hand wires as desired.

By the use of straight cross wires, engaged in the bights of the adjacent interconnecting helically coiled wires, a certain amount of transverse rigidity is provided without affecting the longitudinal flexibility of the belt, and the upstanding flanged edges of the belt will be stiffened transversely without affecting longitudinal flexibility. While any arrangement of helically coiled wires and straight cross wires may be employed, I prefer to use fabric of the type described and illustrated in the Scherfel application, before referred to.

In the conveyer belt which I have provided, there is no strain whatever upon the wire fabric, except its own weight and the weight of the articles carried thereby, hence there will be relatively little or no stretch in the use of the same.

While I have shown the use of sections of fabric made up of interconnected helically coiled wires to serve as supports whereby the continuous section of wire fabric may be hung from the cross-bars carried by the drive chains, it will be understood that I may provide other connections, straight links, or similar supporting devices. I prefer, however, to employ supports in the form of sections of fabric made of interconnected helically coiled wires since such structures provide a series of walls that form with the continuous fabric with the marginal flanges a succession of pockets and insure that articles placed in said pockets will be kept therein throughout the entire run of the same, whether the latter be straight or include inclined portions.

My improved conveyer belt is completely flexible and its arrangement and construction enable it to pass over pulleys quite small in size—six inches or so—as well as larger pulleys of the types employed in conveyer systems. In all the runs of the conveyer, the wire fabric is suspended from the chains.

It is to be understood of course, that modifications may be made in the construction and arrangement of the several elements making up my improved conveyer belt, without departing from the spirit of my invention; all of which is deemed to be within the scope of the appended claims.

I claim:

1. A conveyer belt comprising a plurality of chains arranged in a parallel relation, cross-bars connecting and spacing said chains at intervals, a continuous fabric formed of transversely arranged and interlocking helically coiled wires disposed between said chains; said fabric being spaced some distance below the pitch line of the chains and in substantial parallel relation therewith, and flexible supporting means for said fabric hung from said cross-bars and forming with the fabric a succession of pockets.

2. A conveyer belt comprising a plurality of chains arranged in a parallel relation, cross-bars connecting and spacing said chains at intervals; the ends of said cross bars providing pivotal connections for the links associated therewith, a continuous fabric formed of transversely arranged interlocking helically coiled wires disposed between and lying in a plane below the pitch line of said chains and in substantial parallelism therewith, and flexible supporting means for said fabric hung from said cross-bars.

3. A conveyer belt comprising a plurality of linked chains arranged in a parallel relation, cross-bars connecting and spacing said chains at intervals, a continuous fabric formed of transversely arranged interlocking helically coiled wires disposed between and lying in a plane below the pitch-line of said chains, flanges for said fabric formed by bending the marginal ends of the wires making up the same, and flexible supporting means for said fabric hung from said cross-bars and directly connected with one of the helically coiled wires of the continuous fabric.

4. A conveyer belt comprising a plurality of drive chains in parallel relation with their links in transverse alignment, cross-bars connecting and spacing said chains at intervals, a fabric formed of transversely arranged helically coiled wires disposed between and lying in a plane below the pitch-line of said chains; said fabric having its marginal edges bent substantially at right angles to its transverse wires to form continuous flanges, and flexible supporting means for said fabric hung from said cross-bars and directly connected with one of the helically coiled wires of the continuous fabric and forming therewith pockets.

5. A conveyer belt comprising a plurality of drive chains in parallel relation with their links in transverse alignment, cross-bars connecting and spacing said chains at intervals, a continuous fabric formed of transversely arranged helically coiled wires disposed between and lying in a plane below the pitch-line of said chains with straight cross wires between adjacent bights of the helically coiled wires; said fabric having its marginal edges bent substantially at right angles to its transversely helically coiled and straight wires to form continuous flanges, and flexible supporting means for said fabric hung from said cross-bars and directly connected with one of the helically coiled wires of the continuous fabric and forming therewith pockets.

6. A conveyer belt comprising a plurality of drive chains in parallel relation with their links in transverse alignment, cross-bars connecting and spacing said chains at intervals, a continuous fabric formed of transversely arranged helically coiled wires disposed between said chains; said fabric having its marginal edges bent substantially at right angles to its transverse wires to form continuous flanges, and sections of wire fabric formed from helically coiled wires hung from said cross-bars and connected to said continuous fabric and forming with the latter a series of pockets throughout the length of the belt.

7. A conveyer belt comprising a pair of drive chains in parallel relation, cross-bars spacing said chains and connecting their links in transverse alignment at intervals, a continuous fabric formed of transversely arranged helically coiled wires disposed between said chains and lying in a plane spaced from the pitch line of the chains, and division walls comprising a plurality of helically coiled wires interconnected together and to the cross-bars and the continuous fabric and forming supports for the latter.

8. A conveyer belt comprising a pair of drive chains in parallel relation, cross-bars spacing said chains and connecting their links at intervals in transverse alignment, a continuous flanged fabric formed of transversely arranged helically coiled wires disposed between said chains and lying in a plane spaced from the pitch line of the chains, and division walls comprising a plurality of helically coiled wires interconnected together and to the cross-bars and the continuous fabric; said latter wires forming supports for the continuous flanged fabric and providing a series of pockets.

9. A conveyer belt comprising a pair of drive chains in parallel relation, cross-bars spacing said chains and connecting their links at intervals in transverse alignment, a continuous fabric formed of transversely arranged helically coiled wires with straight connecting cross wires disposed between the bights of adjacent helically coiled wires; said fabric being arranged between the chains and lying in a plane spaced from the pitch line of the latter, and division walls forming with the continuous fabric a series of pockets; said walls comprising a plurality of helically coiled wires interconnected together and to the cross-bars and the continuous fabric and forming supports for the latter.

10. A conveyer belt comprising a plurality of chains arranged in a parallel relation, cross-bars connecting and spacing said chains at intervals, a continuous fabric having marginal flanges and formed of transversely arranged helically coiled interlocking wires with up-turned ends disposed between said chains, and division walls comprising a plurality of helically coiled wires forming flexible supporting means for said continuous fabric hung from said cross-bars and providing pockets.

11. A conveyer belt comprising a plurality of chains arranged in parallel relation, cross-bars connecting and spacing said chains at intervals, a continuous fabric having marginal flanges and formed of transversely arranged helically coiled interlocking wires and straight connecting wires in the bights of said helically coiled wires disposed between and lying in a plane below the pitch line of said chains, and division walls comprising a plurality of helically coiled wires providing pockets and forming flexible supporting means for said fabric hung from said cross-bars.

12. In a conveyer belt, the combination of a pair of drive chains in parallel relation, cross-bars spacing said chains at intervals and connecting their links in transverse alignment, a continuous fabric having marginal flanges and formed of transversely arranged helically coiled wires with straight connecting cross wires disposed between the bights of adjacent helically coiled wires; said fabric being arranged between the chains and lying in a plane spaced from the pitch line of the latter, and division walls forming with the continuous flanged fabric a series of pockets; said division walls lying between the marginal flanges of the continuous fabric and comprising a plurality of interconnected helically coiled wires connected to the cross-bars and the continuous fabric and forming supports for the latter.

13. A conveyer belt comprising a pair of chains arranged in a parallel relation, cross-bars connecting and spacing said chains at intervals, a continuous fabric formed of transversely arranged interlocking helically coiled wires disposed between said chains and in a different plane and depending therefrom, and flexible supporting means for said fabric to define therewith pockets and hung from said cross-bars between the chains.

14. A conveyer belt comprising a plurality of chains arranged in a parallel relation, cross-bars connecting and spacing said chains at regular intervals, a continuous fabric formed of transversely arranged interlocking helically coiled wires disposed between and lying in a plane below the pitch line of said chains; said fabric having marginal flanges formed by up-turning the ends of the helically coiled wires, and flexible supporting means for said fabric comprising a plurality of helically coiled wires in interconnected relation hung from said cross-bars between the marginal flanges of said fabric.

RAYMOND J. GUBA.